United States Patent
Naruhn et al.

(10) Patent No.: US 10,764,453 B2
(45) Date of Patent: Sep. 1, 2020

(54) PRINT SYSTEM FOR PRINTING PICTURES AND/OR DOCUMENTS

(71) Applicant: di support GmbH, Eschborn (DE)

(72) Inventors: Ralph Naruhn, Dreieich (DE); Gordon Schaub, Oberursel (DE)

(73) Assignee: DI SUPPORT GMBH, Eschborn (DE)

(*) Notice: Subject to any disclaimer, the term of this patent is extended or adjusted under 35 U.S.C. 154(b) by 0 days.

(21) Appl. No.: 16/160,689

(22) Filed: Oct. 15, 2018

(65) Prior Publication Data

US 2019/0116281 A1 Apr. 18, 2019

(30) Foreign Application Priority Data

Oct. 13, 2017 (DE) .................. 10 2017 123 937

(51) Int. Cl.
*H04N 1/00* (2006.01)
*G06F 3/12* (2006.01)
*B41J 29/02* (2006.01)
*B41J 29/13* (2006.01)
*G06K 15/02* (2006.01)

(52) U.S. Cl.
CPC .......... *H04N 1/00525* (2013.01); *B41J 29/02* (2013.01); *B41J 29/026* (2013.01); *B41J 29/13* (2013.01); *G06F 3/1212* (2013.01); *B41J 2202/20* (2013.01); *H04N 1/00251* (2013.01); *H04N 1/00334* (2013.01); *H04N 1/00411* (2013.01); *H04N 1/00978* (2013.01)

(58) Field of Classification Search
None
See application file for complete search history.

(56) References Cited

U.S. PATENT DOCUMENTS

| | | | | |
|---|---|---|---|---|
| 4,707,156 A | * | 11/1987 | Clark | B41J 11/58 248/676 |
| 5,666,599 A | * | 9/1997 | Miyasaka | G03G 5/04 347/225 |
| 5,883,371 A | * | 3/1999 | Meeker | G07D 11/009 235/375 |
| 5,923,406 A | | 7/1999 | Brasington et al. | |
| 6,035,719 A | * | 3/2000 | Toyota | G01H 3/12 73/649 |
| 6,241,407 B1 | * | 6/2001 | Huggins | B41J 3/36 101/288 |

(Continued)

FOREIGN PATENT DOCUMENTS

| | | | | |
|---|---|---|---|---|
| CN | 203995105 U | 12/2014 | | |
| WO | WO-2017066862 A1 | * | 4/2017 | G03B 15/00 |
| WO | WO-2017145115 A1 | * | 8/2017 | G08B 21/22 |

*Primary Examiner* — Beniyam Menberu
(74) *Attorney, Agent, or Firm* — Socal IP Law Group LLP; Jonathan Pearce

(57) ABSTRACT

The invention relates to a printing system for printing images and/or documents with at least a first printing module.
To allow flexible setting up, the printing module has a cuboidal housing with a top part, a bottom part, a front part, a rear part and two side parts, the top part with the bottom part and also the two side parts forming a body, which is closed on the front side by the front part and on the rear side by the rear part, a receiving space for a printer being formed within the body and an operator interface and also a removal opening, connected to a removal compartment, for the print media coming out of the printer being formed in the front part.

21 Claims, 3 Drawing Sheets

(56) References Cited

U.S. PATENT DOCUMENTS

Figure 1:
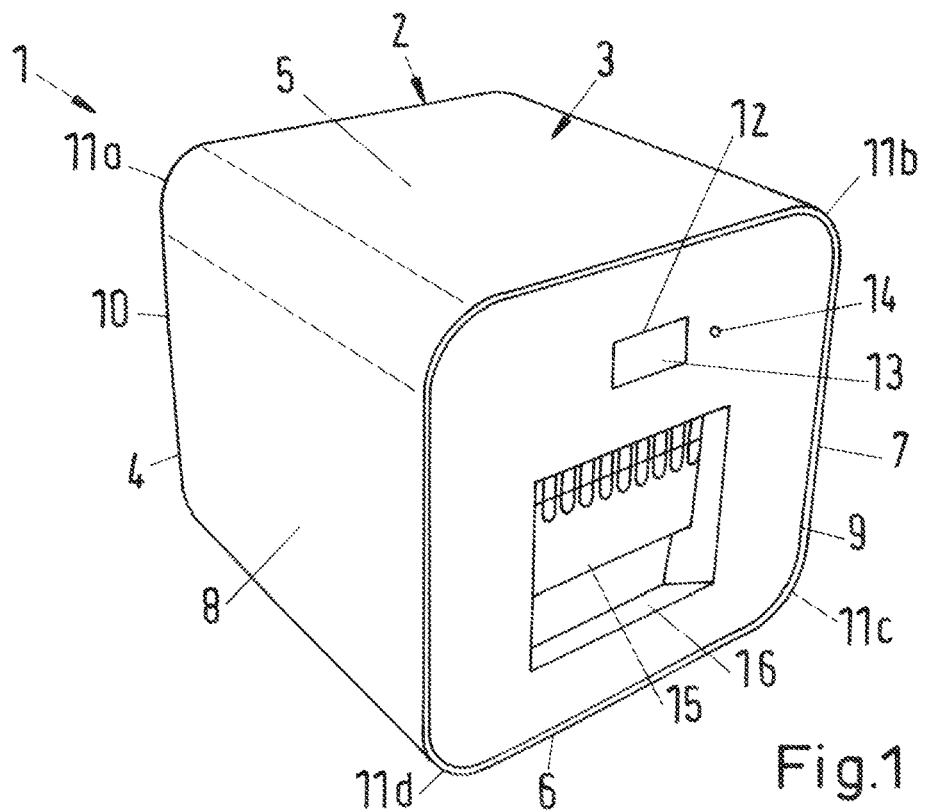

| | | | |
|---|---|---|---|
| 6,607,322 B2* | 8/2003 | Aruga | B41J 15/042 |
| | | | 400/611 |
| 6,626,110 B1* | 9/2003 | Keller | B41J 13/00 |
| | | | 101/479 |
| 7,465,110 B2 | 12/2008 | Namekawa et al. | |
| 9,211,025 B1* | 12/2015 | Elhawwashy | A47G 29/14 |
| 2003/0001957 A1* | 1/2003 | Kubota | H04N 1/00132 |
| | | | 348/207.2 |
| 2005/0036819 A1* | 2/2005 | Monteith | B41J 3/4075 |
| | | | 400/615.2 |
| 2006/0159500 A1* | 7/2006 | Takagi | G03G 15/6552 |
| | | | 399/405 |
| 2007/0061723 A1* | 3/2007 | Ohga | H04N 1/00143 |
| | | | 715/705 |
| 2007/0097161 A1 | 5/2007 | Ejiri et al. | |
| 2008/0070500 A1* | 3/2008 | Rapp | H04N 5/2251 |
| | | | 455/41.1 |
| 2008/0252917 A1* | 10/2008 | Kuroda | G03B 17/53 |
| | | | 358/1.13 |
| 2009/0324285 A1* | 12/2009 | Otsuka | B65H 1/266 |
| | | | 399/124 |
| 2010/0091321 A1* | 4/2010 | LeVier | H04N 1/00132 |
| | | | 358/1.15 |
| 2011/0211819 A1* | 9/2011 | Reno | G03B 15/02 |
| | | | 396/2 |
| 2012/0312761 A1* | 12/2012 | White | H02G 3/0608 |
| | | | 211/13.1 |
| 2014/0253949 A1* | 9/2014 | Tsujimoto | H04N 1/0084 |
| | | | 358/1.14 |
| 2015/0002605 A1* | 1/2015 | Aizawa | B41J 15/042 |
| | | | 347/222 |
| 2017/0120524 A1* | 5/2017 | Liu | B33Y 30/00 |
| 2017/0210156 A1* | 7/2017 | Klocke | B41J 29/02 |
| 2018/0067381 A1* | 3/2018 | Aflatooni | G03B 15/00 |
| 2018/0329350 A1* | 11/2018 | Sugiyama | B41J 11/001 |

* cited by examiner

PRINT SYSTEM FOR PRINTING PICTURES AND/OR DOCUMENTS

The invention relates to a printing system for printing images and/or documents with at least one printing module.

Such printing systems are also referred to for example as "print terminals" or "instant print kiosks" and are used for example in retail outlets such as branches of drugstore chains, supermarkets and the like, to enable customers to print out their digital images, for example from a cell phone or smart phone.

The selection of images to be printed is generally made after connecting the cell phone or the storage medium via an operator interface of the printing system, the image then being subsequently output by means of a printer of the printing system that is assigned to the operator interface. This solution requires use of relatively complex hardware and is accordingly costly.

The known solutions in themselves operate satisfactorily, but require a relatively great amount of space and offer only little flexibility with regard to setting up and the number of printing stations. At the same time, the selection made at the operator interface and any possible post-editing of the images or documents to be printed mean that the respective printer is blocked for a relatively long time, so that under some circumstances the customers must wait for a correspondingly long time for a place at the printing system to become free. To speed up the whole procedure, a relatively large number of printers and operator interfaces would have to be provided, which however is often not possible for reasons of space and cost.

The invention is therefore based on the object of overcoming the disadvantages of the prior art and providing a printing system that can be flexibly set up and allows a high throughput.

This object is achieved according to the invention by a printing system with the features of claim 1. Particularly advantageous configurations are the subject of the subclaims.

In the case of a printing system for printing images and/or documents with at least a first printing module, it is provided according to the invention that the printing module has a cuboidal housing with a top part, a bottom part, a front part, a rear part and two side parts, the top part with the bottom part and also the two side parts forming a body, which is closed on the front side by the front part and on the rear side by the rear part, a receiving space for a printer being formed within the body and an operator interface and also a removal opening, connected to a removal compartment, for the print media coming out of the printer being formed in the front part.

As a result of the cuboidal housing, the printing module can in this case be relatively compact and only a little larger that the printer accommodated in it. At the same time, by choosing an appropriate number of printing modules, the printing system can be adapted relatively easily to the desired capacity, the cuboidal body allowing the printing modules to be combined with one another in a space-saving manner. At the same time, the operator interface formed in the front part allows each printing module to be used as a stand-alone device, though an interconnection of all the printing modules of a printing system is preferred. The removal opening that is likewise formed on the front part, that is to say in the spatial vicinity of the operator interface, allows a direct removal of the finished images or documents. This obviates the possible need to search for images or documents, with the risk of mixing them up with other printouts.

More preferably, the body is formed as one part. As a result, it can be produced relatively stably, while at the same time with a low weight. For example, it is in this case produced from plastic, metal, wood or a combination of these materials. At the same time, edges, that is to say transitions from the side parts to the bottom part or top part, can be rounded to a greater or lesser extent, whereby possible stress peaks in the material and the risk of injuries are avoided.

In a preferred development, the operator interface has a touch-sensitive display. A touch-sensitive display, that is to say a so-called "touch display", allows both user-defined inputs and the direct visual presentation of information. It is thus possible to dispense with additional possibilities for input, such as for example haptic elements such as keyboards or switches. This minimizes the production costs and the risk of damage, and additionally facilitates cleaning of the printing module.

The operator interface preferably has a camera or a barcode reader. This camera or the barcode reader can then be used for reading information into the printing system. With particular advantage, this camera can be used for detecting a machine-readable code such as a QR code and on this basis calling up various functions. For example, in this way different user levels of the user interfaces are set and/or specific images or documents are released for printing.

In a preferred configuration, the front part is pivotably fastened on one of the side parts and can be releasably fixed on the other side part by means of a holding device. The front part is then movably fastened on the body like a door. Easy opening makes unhindered access possible to the receiving space, and consequently to the printer.

It is in this case particularly preferred that the holding device has a lock, by means of which it can be moved by a key between a holding position and a releasing position. Unauthorized opening of the housing, and consequently access to the receiving space and consequently to the printer, can in this way be reliably prevented.

Advantageously, the removal compartment is arranged on an inner side of the front part. The outer side of the front part may then be formed with a smooth surface or level, without any projections or the like, access to the removal compartment being provided through the removal opening. In this case, the arrangement of the removal compartment on the inner side of the front part additionally has the advantage that it is fastened in the printing module relatively independently of the printer, and consequently is always correctly positioned in relation to the removal opening.

In a particularly preferred configuration, a receiving compartment for a computer, formed in particular as a mini PC, is arranged on the inner side of the front part. With such a computer, the printing module is fully operational, and consequently can be used autonomously and without much installation expenditure. Being arranged on the inner side of the front part means that the computer is then accessible for maintenance work easily and independently of the printer, by easy opening of the front part.

It may in this case be provided that the receiving compartment for the computer and the removal compartment are connected as one, for example by means of continuous side walls. The receiving compartment and the removal compartment therefore represent a unit that is relatively stable and also can additionally stiffen the front part.

More preferably, the computer with the operator interface and possibly the camera form an exchangeable unit. Each printing module consequently has a computer of its own, with an operator interface and a camera, it being possible for this unit to be easily exchanged in the event of a defect and a new, ready-made unit used. Possible downtimes are therefore kept short.

The receiving space is preferably divided by a shelf, which in particular rests on slats. This allows printers of different sizes always to be accommodated in the housing of the printing module in such a way that finished print media can enter the removal compartment and be removed from there without any problem.

It is particularly preferred in this case that the slats are arranged on the inside of the bottom part and connect the side parts to one another. Consequently, the slats additionally serve as a stiffening for the body, and thereby increase the stability of the housing.

In a preferred configuration, a central, in particular round, opening is respectively formed in the top part and/or the bottom part. On the one hand, this opening may serve for the exchange of air, to dissipate heat from the components accommodated in the housing; on the other hand, various lines, which for example serve for supplying power or for exchanging data, may be led through these openings into the printing module. These lines are therefore not readily accessible from the outside, and consequently are protected for example from vandalism.

It is particularly preferred in this case that slits, in particular in the form of segments of a circle, are made in the top part and/or the bottom part, parallel to the opening. These slits can be used particularly easily for fastening printing modules arranged one above the other and also allow an angular setting about a vertical axis of the printing modules in relation to one another.

In a preferred configuration, ventilation slits are formed between the front part and the body and/or the rear part and the body. These ventilation slits are visually scarcely perceptible, and nevertheless allow air be effectively supplied to the receiving space, and consequently to a printer arranged there and to the computer. The slits are in this case formed as relatively narrow, but long.

At the same time, ventilation openings may be formed in the rear part. The rear part is generally facing away from a user and aligned parallel to a rear wall of the printer, in which venting openings are often likewise provided. Warm air can therefore leave the housing relatively unhindered, while contamination of the ventilation openings, for example by the user, is rather unlikely.

In the case of a preferred embodiment, a covering element is arranged on an upper side of the top part, and covers at least a large part of the upper side, and in particular is let into a recess formed in the upper side. This covering element may have on its underside a geometry with which it can be fixed, in particular locked in place, for example with the opening and/or the slits and/or additional formations in the top part of the body. An externally invisible, theft-proof fastening is thereby possible. The covering element can in this case either be kept relatively simple, and essentially only cover the upper side and the opening of the top part, or else it is possible to provide the covering with a cut-resistant surface or for example a seat cushion. The application area of the printing module can therefore be adapted to different circumstances.

A multifunctional element is preferably arranged on the top part, in particular aligned perpendicularly thereto. The multifunctional element may in this case be formed for example as a shelf or as a display panel or else as a combination of the two. At the same time, a display such as an LCD screen, on which for example price information or operating instructions are displayed, may also be fastened on the multifunctional element. The activation of this display may then possibly take place from the computer accommodated in the printing module.

In a preferred development, a collecting element is hung from an outer side of the front part in the removal opening for print media. This collecting element may for example serve as a way of increasing the capacity for the integrated removal compartment, but also be used for example for print media in special formats that could not be accommodated in the integrated removal compartment without being folded. Hanging the collecting element in the removal opening allows it to be attached to the housing relatively easily without any structural modification, and also to be retrofitted.

In this case, the collecting element preferably has a first deflecting element and a second deflecting element, a print medium coming from the printer being deflected by means of the deflecting elements in such a way that it passes under the bottom part parallel to the bottom part. The first deflecting element can then be used to guide the print medium through the removal opening and the second deflecting element can be used to deflect the print medium in such a way that it is guided under the body. This allows even elongate paper formats, such as for example panoramic photos, to be produced and collected in the collecting element without being folded.

More preferably, the printing system has at least two printing modules arranged one above the other, which are connected to one another by means of a fastening device. The capacity of the printing system can in this way be easily multiplied, good utilization of space being possible as a result of the arrangement of the printing modules.

In this case, the fastening device preferably engages in the opening and/or slits of the top part of the lower module and in the opening and/or slits of the bottom part of the upper module and fixes the modules in relation to one another. As a result, when the housing is closed, the fastening device is accommodated in such a way that it is invisible, and consequently safe from manipulation.

Lines for supplying power and transmitting data are preferably led through the openings. The printing modules can therefore be easily connected to one another and the printers and operator interfaces and computers arranged therein can not only be supplied with electrical energy but also with further data. This allows an interconnection of the printing modules with one another to be performed relatively easily and the computing power and/or the respectively available memories to be used together.

In a preferred development, the printing system comprises a number of printing modules, also arranged next to one another, which are interconnected with one another and in particular provide a common access network. Consequently, the printing system is not restricted to printing modules arranged one above the other, but may also comprise both a number of printing modules arranged next to one another and a number of printing modules arranged one above the other. A common access network makes operation extremely easy for a user, because the user for example first selects the desired images on his or her cell phone and then transmits them via the access network to the printing system. Only then is it necessary to select any one of the printing modules of the printing system by means of which the images or documents are output. The selection may in this case be performed for example by means of the operator interface of the selected printing module, in that for example the camera is used for reading in a machine-readable code received on the cell phone after transmission of the images/documents. The printing system is therefore extremely easy to operate and incorrect operation is virtually ruled out.

Figure 2:
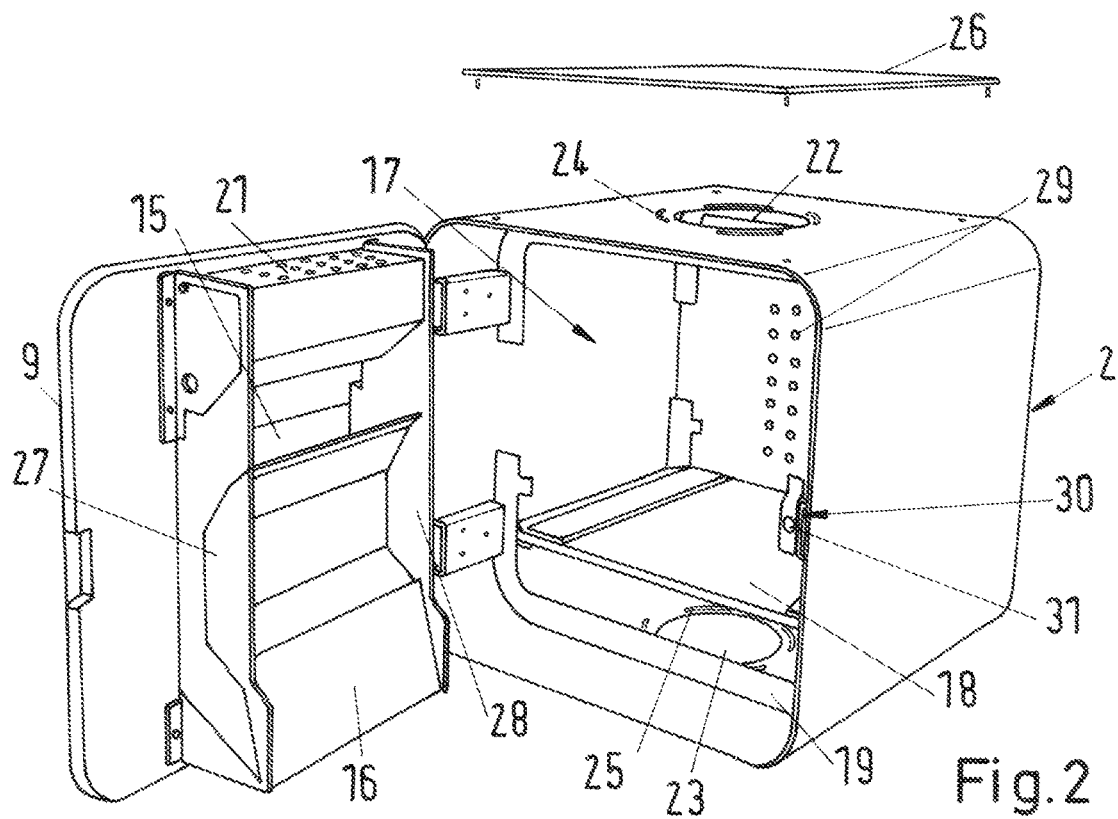
Figure 3:
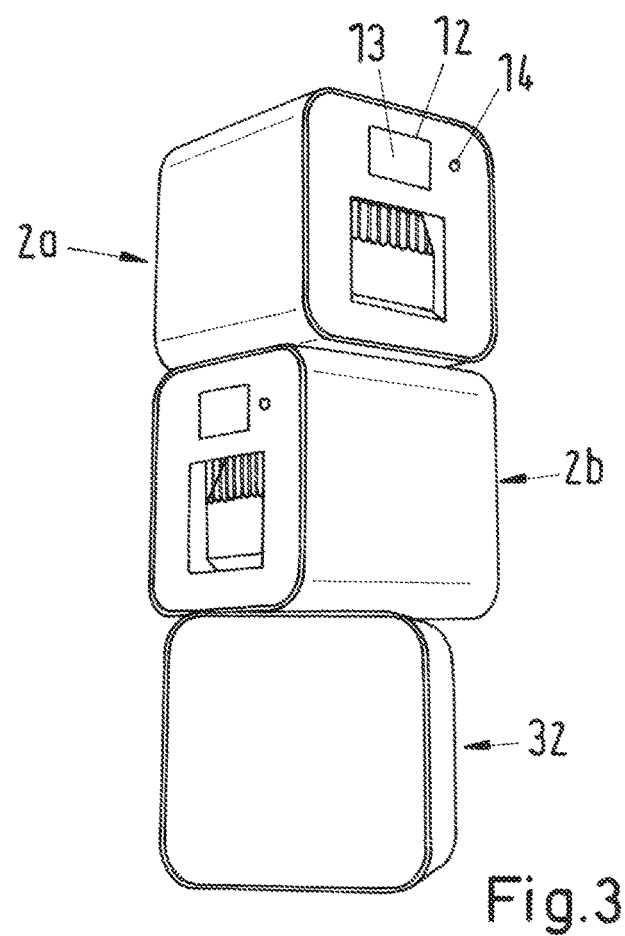
Figure 4:
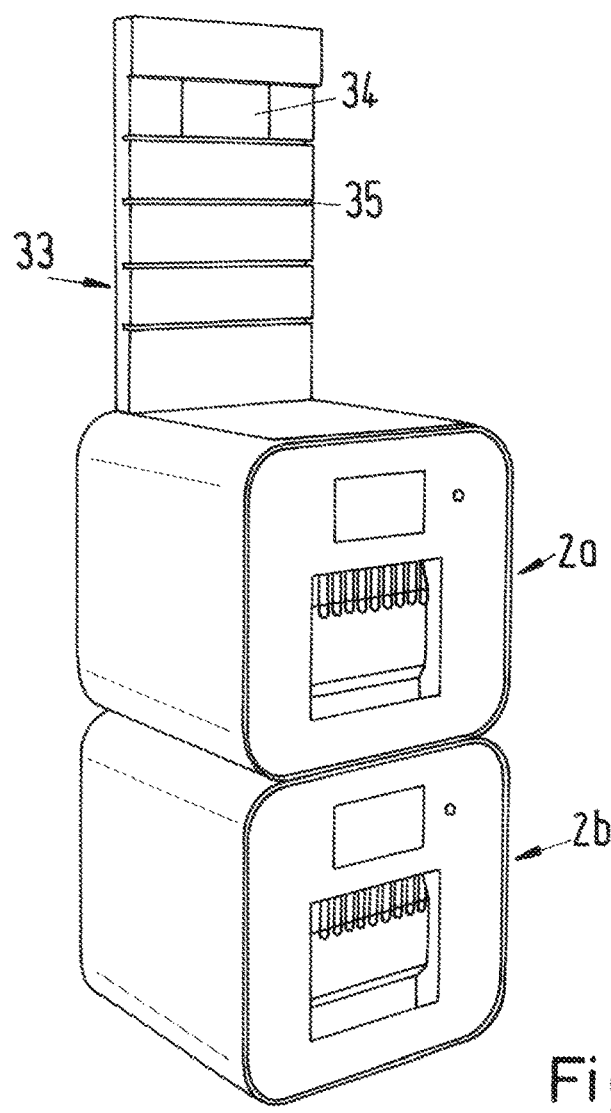
Figure 5:
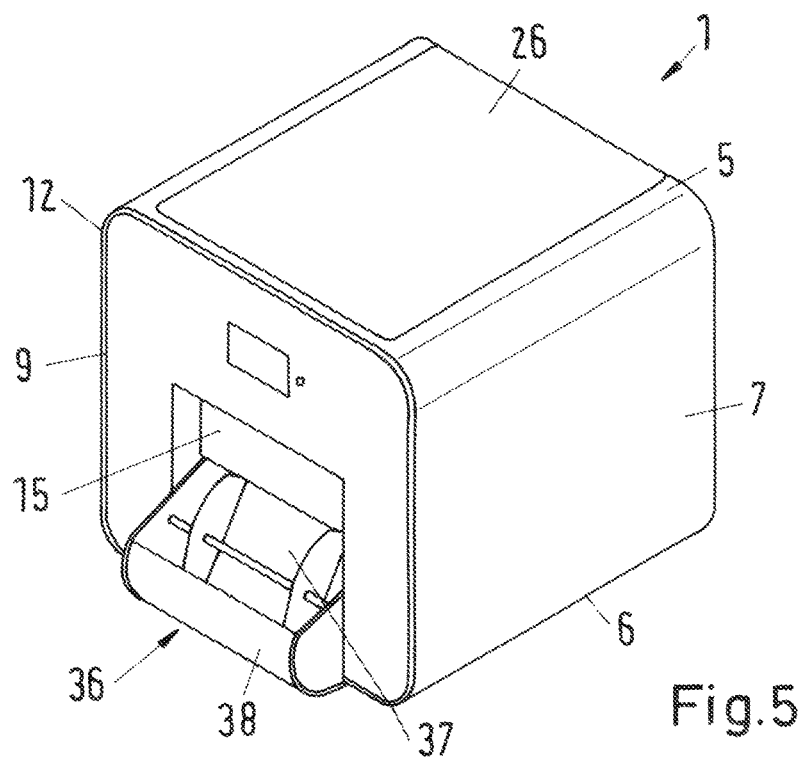
Figure 6:
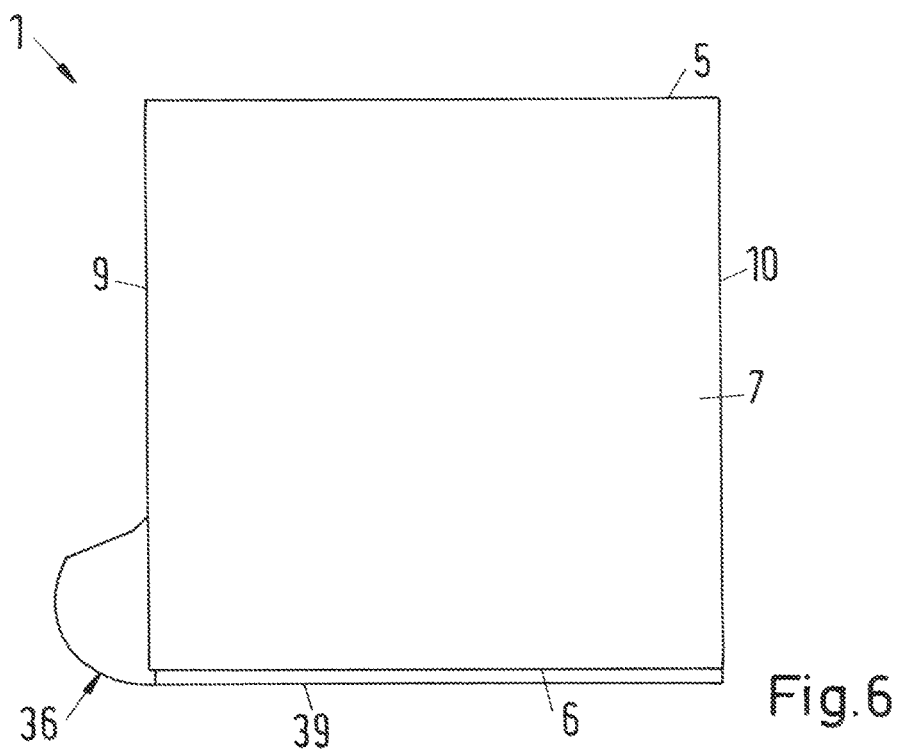

Further features, details and advantages of the invention emerge from the wording of the claims and from the following description of exemplary embodiments on the basis of the drawings, in which:

FIG. 1 shows a printing module of a printing system in a three-dimensional view, FIG. 2 shows the printing module with the front part opened, FIG. 3 shows a printing system with a number of printing modules and FIG. 4 shows a printing system with a number of printing modules and a multifunctional element, FIG. 5 shows the printing module with a collecting element in a three-dimensional view and FIG. 6 shows the printing module as shown in FIG. 5 in side view.

In FIG. 1, a printing system 1 with a printing module 2 is shown in a three-dimensional representation. The printing module 2 has a cuboidal housing 3 with a body 4. The body 4 comprises a top part 5 and a bottom part 6, which are respectively connected to one another by means of side parts 7, 8 in such a way that the top part 5 and the bottom part 6 with the two side parts 7, 8 form the body 4 in the form of a rectangular frame. On the front side, the body 4 is closed by a front part 9, and on the rear side it is closed by a rear part 10. Edges 11a, 11b, 11c, 11d of the body, that is to say transitions from the side parts 7, 8 to the bottom part 6 and the top part 5, are in this case rounded to a relatively great extent. This allows a one-part or one-piece production of the body 4, and for example minimizes the risk of a user catching himself or herself on these edges. In this case, the body 4 is preferably produced from metal and the front part 9 and the rear part 10 are preferably produced from a plastic.

An operator interface 12 is formed in the front part 9. The operator interface 12 in this case comprises a touch-sensitive display 13, that is to say a so-called touch display, and also a camera 14.

In the front part 9 there is also unhindered access through a removal opening 15 to a removal compartment 16, which is fastened to the inside of the front part 9, and consequently lies within the housing 3. The removal compartment 16 serves for receiving finished print media such as images and/or documents and covers the removal opening 15 on the inside in such a way that no access is possible through the removal opening 15 to a receiving space for a printer that is formed in the housing 3.

In FIG. 2, the printing module 2 is shown with an opened front part 9. For this, the front part 9 is pivotably fastened on the side part 8 and can be opened like a door. As a result, it is possible to access the interior of the housing, in which a receiving space 17 for a printer is formed. The receiving space 17 is in this case divided by a shelf 18, on which the printer is positioned. The shelf 18 in this case rests on slats 19, which on the inside connect the side parts 7, 8 to one another and extend perpendicularly from the bottom part 6. In this case, the slats 19 have projections, on which the shelf 18 can be arranged at different heights. As a result, an adaptation to different printers can be performed.

Not only the removal compartment 16 but also a receiving compartment 21 are arranged on an inner side 20 of the front part 9. The receiving compartment 21 is in this case located at a position in which it covers the operator interface 12 visible from an outer side of the front part 9. Accommodated in the receiving compartment 21 is a computer in the form of a mini PC, such as for example a Raspberry Pi, which is connected to the operator interface and can activate a printer accommodated in the receiving space 17, for example via a USB (Universal Serial Bus). The computer also has wire-bound and wireless network connections.

The receiving compartment 21 and the removal compartment 16 are connected to one another by means of side walls 27, 28, and thereby form a unit. This produces a high degree of stability with a relatively large contact area in relation to the inner side 20 of the front part 9, which is consequently likewise stiffened.

A round opening 22, 23 is also respectively formed centrally both in the top part 5 and in the bottom part 6, and these round openings are surrounded by slits 24, 25 in the form of segments of a circle. On the one hand, an exchange of air, and consequently a cooling of the receiving space 21, can take place through these openings 22, 23; on the other hand, lines for supplying power and transmitting data can be led through them into the interior of the housing 3. The slits 24, 25 may be used for a fastening device that is not shown, in order for example to fix printing modules 2 arranged one above the other to one another. In the simplest case, the fastening device is in this case formed by a number of pairs of screws and nuts.

An upper side of the top part 5 may be covered by a covering element 26. In the case of this exemplary embodiment, the rectangular covering element 26 has projecting feet in its corner regions, and these can be pushed into corresponding recesses in the top part 5 and thereby hold the covering element 26 on the body 4. Alternatively, a fastening geometry may also be formed on the covering element 26, with which it can be fastened, in particular locked in place, in the opening 22 or the slits. A recess may possibly be formed in the top part 5, in order to receive the covering element 26 more or less flush.

Ventilation openings 29, the shape and number of which may vary, are formed in the rear part 10. Furthermore, for a good exchange of air, and consequently good cooling of the receiving space 17, ventilation slits are formed between the front part 9 and the body 4 and also between the rear part 10 and the body 4, and in particular these slits run parallel to the body and are so narrow that at first glance they are unnoticed. Nevertheless, they can provide good venting.

The front part 9 is pivotably fastened on the side part 8 and can be fixed on the other side part 7 by means of a holding device 30, which comprises a lock 31, which can be operated by means of a key. Unauthorized opening of the printing module 2 can consequently be reliably prevented. Instead of a mechanical lock 31, a magnetic lock for example could alternatively also be used, but this does not generally offer protection from theft.

Represented in FIG. 3 is a printing system with two printing modules 2a, 2b arranged one above the other, which are arranged on a further module 32. The further module 32 only differs from the printing modules 2a, 2b by a different type of front part, without an operator interface and removal opening. Otherwise, the module 32 is structurally the same as the printing modules 2a, 2b and offers additional storage space, for example for consumable materials.

The printing modules 2a, 2b and the module 32 are connected to one another by means of fastening devices that are not shown and are fixed at a desired angle about their vertical axis. In this case, the fastening devices engage in the slits in the form of segments of a circle, an upper side of the uppermost printing module 2a being provided with a covering element. The printing modules are in this case supplied with power and data by means of lines that are led invisibly through the corresponding openings.

Represented in FIG. 4 is a further printing system with two printing modules 2a, 2b, a multifunctional element 33 being arranged on an upper side of the upper printing module 2a and extending perpendicularly to the upper side of the printing module 2a. In the case of this example, the multifunctional element 33 has a display 34 and also slots 35, into which terminal boards, hooks and the like can be introduced.

The designs as shown in FIG. 3 and FIG. 4 may of course be combined with one another and with further printing modules without any problem in order to obtain a printing system with the respectively desired capacity. In this case, more preferably all of the printing modules of a printing system are interconnected with one another and provide a common access network, that is to say a so-called hotspot, for the users. In this case the printing modules may in particular share their respective computing and storage capacities. The selection of the printing module for the output of the images or documents is then only made by the user after selecting and uploading the corresponding files. In this case, the selection is made by means of the operator interface, for example by entering a specific code, more preferably a machine-readable code being read in by means of the camera of the operator interface, and displayed for example on the screen of the cell phone. The printing operation can then start very promptly, so that the printing module is already available to the next user after a relatively short time.

FIG. 5 shows the printing module 2 in a three-dimensional view, a collecting element 36 having been hung in the removal opening 15 for print media on an outer side of the front part 9. Longer print formats, such as panoramic prints or banners, are in this case directed out of the removal opening 15 by means of first deflecting elements 37 and then guided by means of a second deflecting element 38 in such a way that they finally pass under the bottom part 6 of the printing module 1.

It can be seen from the side view of the printing module 1 according to FIG. 6 that the print formats are in this case deposited on a continuation 39, which extends under the printing module 2 parallel to the bottom part 6.

As a result of corresponding feet or spacers (not shown) on the bottom part 6 of the printing module 2, sufficient space is available for the continuation 39, even when there are a number of printing modules 2 arranged one above the other, and the continuation 39 is not subjected to the load of the weight of the printing module 2.

The invention is not restricted to one of the embodiments described above, but can be modified in various ways. Thus, for example, the printing system may also comprise more than the printing modules shown. Instead of the cube form with edges of equal length that is shown, the housing could also be extended at least in one spatial direction.

All of the features and advantages emerging from the claims, the description and the drawing, including structural design details, spatial arrangements and method steps, may be essential to the invention both in themselves and in a wide variety of combinations.

LIST OF DESIGNATIONS

1 Printing system
2 Printing module
3 Housing
4 Body
5 Top part
6 Bottom part
7 Side part
8 Side part
9 Front part
10 Rear part
11 Edge
12 Operator interface
13 Touch-sensitive display
14 Camera
15 Removal opening
16 Removal compartment
17 Receiving space
18 Shelf
19 Slat
20 Inner side
21 Receiving compartment
22 Opening
23 Opening
24 Slit
25 Slit
26 Covering element
17 Side wall
28 Side wall
29 Ventilation opening
30 Holding device
31 Lock
32 Module
33 Multifunctional element
34 Display
35 Slot
36 Collecting element
37 First deflecting element
38 Second deflecting element
39 Continuation

The invention claimed is:

1. A printing system for printing images and/or documents with at least a first printing module, wherein the first printing module comprises:
    a cuboidal housing with a top part, a bottom part, a front part, a rear part and two side parts the top part with the bottom part along with the two side parts together forming a body;
    wherein the body is closed on a front side by the front part and on a rear side by the rear part;
    a receiving space for a printer being formed within the body;
    an operator interface, a removal opening, and a removal compartment each formed in the front part, the removal opening connected to the removal compartment for print media exiting the body;
    wherein a collecting element is hung from an outer side of the front part in the removal opening for print media; and
    wherein the collecting element has a first deflecting element and a second deflecting element, a print medium coming from the printer being deflected by means of the deflecting elements in such a way that it passes under the bottom part parallel to the bottom part.

2. The printing system as claimed in claim 1, wherein the body is formed as one part.

3. The printing system as claimed in claim 1, wherein the operator interface has a touch-sensitive display.

4. The printing system as claimed in claim 1, wherein the operator interface has a camera or a barcode reader.

5. The printing system as claimed in claim 1, wherein the front part is pivotably fastened on one of the side parts and releasably fixed on the other side part by means of a holding device.

6. The printing system as claimed in claim 1 further comprising a holding device, wherein the holding device has a lock, by means of which it can be moved by a key between a holding position and a releasing position.

7. The printing system as claimed in claim 1, wherein the removal compartment is arranged on an inner side of the front part.

8. The printing system as claimed in claim 1, wherein a receiving compartment for a computer, formed in particular as a mini PC, is arranged on an inner side of the front part.

9. The printing system as claimed in claim 8, wherein the computer with the operator interface and optionally the camera form an exchangeable unit.

10. The printing system as claimed in claim 1, wherein the receiving space is divided by a shelf, which in particular rests on slats.

11. The printing system as claimed in claim 10, wherein the slats are arranged on the inside of the bottom part and connect the side parts to one another.

12. The printing system as claimed in claim 1, wherein a central, round opening is respectively formed in the top part and/or the bottom part.

13. The printing system as claimed in claim 12, wherein slits, in the form of segments of a circle, are made in the top part and the bottom part, parallel to the opening.

14. The printing system as claimed in claim 1, wherein ventilation slits are formed between the front part and the body and/or the rear part and the body.

15. The printing system as claimed in claim 1, wherein ventilation openings are formed in the rear part.

16. The printing system as claimed in claim 1, wherein a covering element is arranged on an upper side of the top part, and covers at least a large part of the upper side.

17. The printing system as claimed in claim 1, wherein a multifunctional element is arranged on the top part, in particular aligned perpendicularly thereto.

18. The printing system as claimed in claim 1, wherein it has at least two printing modules arranged one above the other, which are connected to one another by means of a fastening device.

19. The printing system as claimed in claim 18, wherein the fastening device engages in the opening of the top part of the lower module and in the opening of the bottom part of the upper module and fixes the modules in relation to one another.

20. The printing system as claimed in claim 18, wherein lines for supplying power and transmitting data are led through the openings.

21. The printing system as claimed in claim 1, wherein it comprises a number of printing modules, also arranged next to one another, which are interconnected with one another and in particular provide a common access network.

* * * * *